(12) United States Patent  (10) Patent No.: US 8,256,324 B2
Laming et al.  (45) Date of Patent: Sep. 4, 2012

(54) SHIFTER WITH ONE-TOUCH LOCKING KNOB

(75) Inventors: Robert J. Laming, Grand Rapids, MI (US); Scott Ebenstein, Rockford, MI (US)

(73) Assignee: GHSP, Inc., Grand Haven, MI (US)

( * ) Notice: Subject to any disclaimer, the term of this patent is extended or adjusted under 35 U.S.C. 154(b) by 1099 days.

(21) Appl. No.: 12/165,806

(22) Filed: Jul. 1, 2008

(65) Prior Publication Data

US 2009/0007712 A1 Jan. 8, 2009

Related U.S. Application Data

(60) Provisional application No. 60/947,729, filed on Jul. 3, 2007.

(51) Int. Cl.
*G05G 1/04* (2006.01)

(52) U.S. Cl. ......................................................... 74/523

(58) Field of Classification Search .................. 74/473.3, 74/523, 553
See application file for complete search history.

(56) References Cited

U.S. PATENT DOCUMENTS

| | | | |
|---|---|---|---|
| 1,091,212 A | 3/1914 | Gregory |
| 1,156,272 A | 10/1915 | Cass |
| 1,887,640 A | 11/1932 | Hickman |
| 2,013,962 A | 9/1935 | Hutchens |
| 3,401,574 A | 9/1968 | Doolittle |
| 3,561,281 A | 2/1971 | Wilfert |
| 3,657,943 A | 4/1972 | Bruh, Jr. et al. |
| 3,899,934 A | 8/1975 | Froumajou |
| 3,961,855 A * | 6/1976 | Basile ............................ 403/329 |
| 3,998,110 A | 12/1976 | O'Brien et al. |
| 4,106,311 A | 8/1978 | Euler |
| 4,113,399 A * | 9/1978 | Hansen, Sr. ................... 403/329 |
| 4,207,794 A | 6/1980 | Collister |
| 4,492,129 A | 1/1985 | Hasegawa |
| 4,505,058 A | 3/1985 | Peterson |
| 4,598,606 A | 7/1986 | Foggini |
| 4,603,598 A | 8/1986 | Tsuji et al. |
| 4,862,760 A | 9/1989 | Kuwahara et al. |
| 5,189,925 A | 3/1993 | Neal et al. |
| 5,313,853 A | 5/1994 | Olmsted et al. |
| 5,556,224 A | 9/1996 | Niskanen |
| 5,588,329 A * | 12/1996 | Nedachi ..................... 74/473.36 |
| 5,806,378 A * | 9/1998 | Friedman ........................ 74/553 |
| 6,421,881 B1 * | 7/2002 | Shovlin ............................ 16/441 |
| 7,546,783 B2 * | 6/2009 | Tucker et al. .................... 74/543 |

FOREIGN PATENT DOCUMENTS

EP 0 399 896 A1 11/1990

* cited by examiner

*Primary Examiner* — Vicky Johnson

(74) *Attorney, Agent, or Firm* — Price Heneveld LLP

(57) ABSTRACT

A transmission shifter includes a shift lever, and a knob with attachment clip that mechanically locks the knob atop the lever with a single assembly motion. The clip is located inside a hole in the select knob, and the lever includes a notch near its top. The clip is positioned to flex to facilitate assembly as the lever is inserted into the hole, but then unflex to engage the notch and lock the knob to the lever. To remove the knob from the lever, a removal tool is used to depress the clip, pushing it out of the way and allowing the select knob to be pulled off the lever. The illustrated shifters include a mechanically-actuated pawl actuator system and an electrically-actuated pawl actuator system.

16 Claims, 3 Drawing Sheets

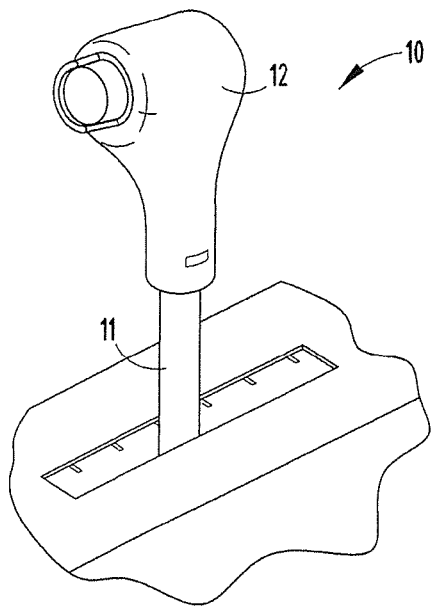
FIG. 1
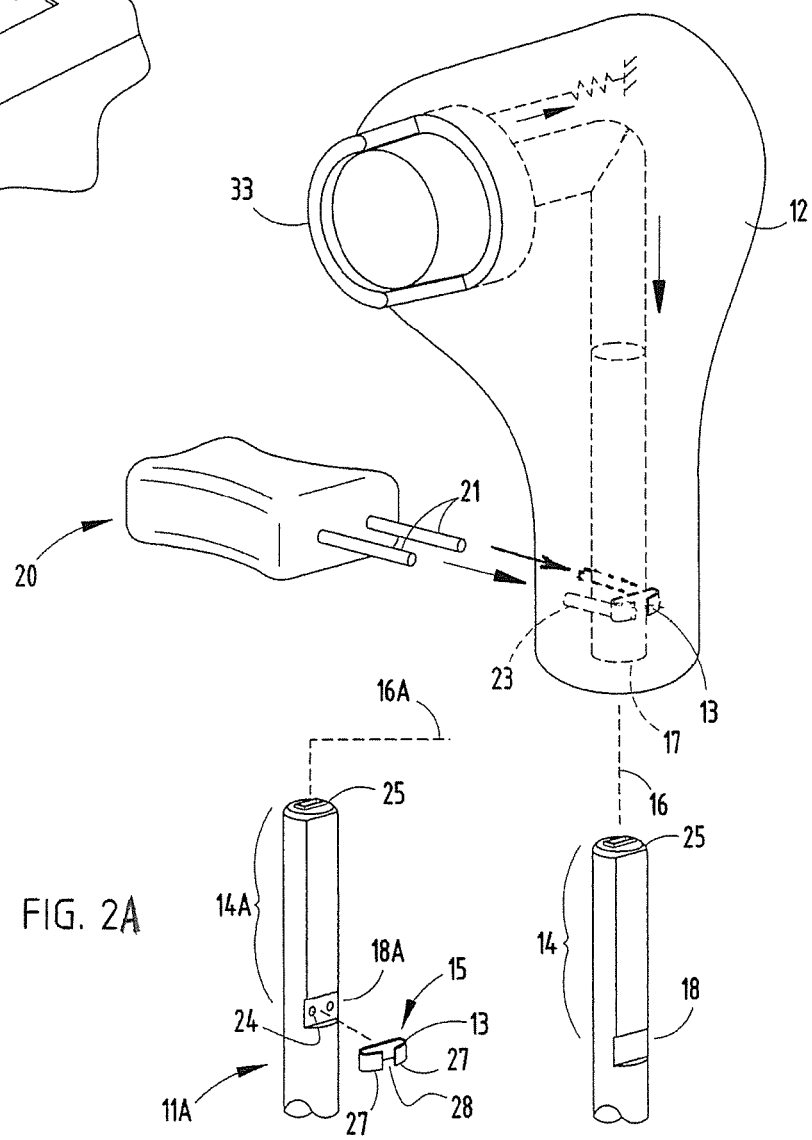
FIG. 2
FIG. 2A

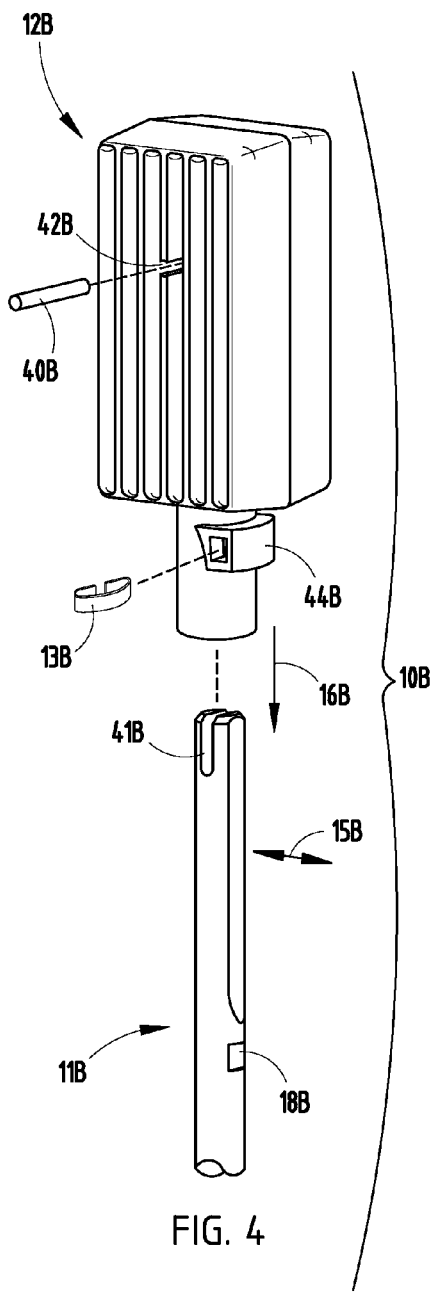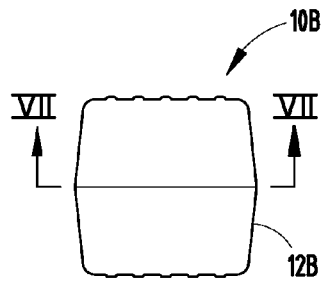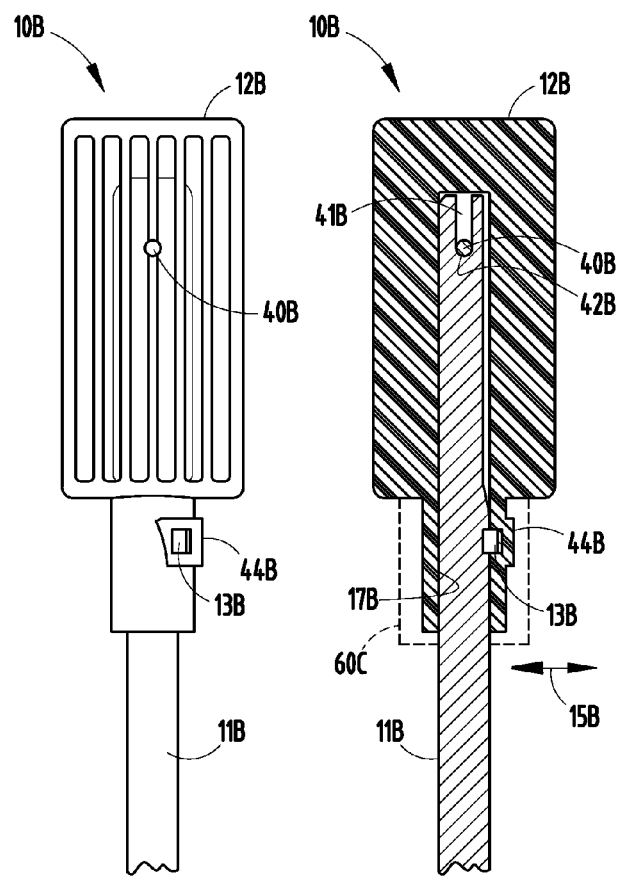
FIG. 4
FIG. 6
FIG. 5
FIG. 7

SHIFTER WITH ONE-TOUCH LOCKING KNOB

This application claims benefit under 35 U.S.C. §119(e) of provisional application Ser. No. 60/947,729, filed Jul. 3, 2007, entitled SHIFTER WITH ONE TOUCH LOCKING KNOB, the entire contents of which are incorporated herein by reference.

BACKGROUND

The present invention relates to a vehicle shifter having a knob for a vehicle driver to grasp.

Shifter knobs must be securely attached to the top of a shift lever post, but preferably in a manner that minimizes assembly time and with attachment structure that does not detract from the overall appearance of the shift lever. At the same time, the attachment structure preferably should allow separation for repair and/or replacement. Also, the attachment structure should require a minimum of components and that are relatively lower in cost.

SUMMARY OF THE PRESENT INVENTION

In one aspect of the present invention, a shifter for a vehicle having a transmission includes a shift lever including a notch near its top, and a knob with attachment clip that mechanically locks the knob atop the lever with a single assembly motion. The clip is located inside an elongated hole in the knob and is characteristically not removable from a lateral side of the knob. The elongated hole is shaped to receive the top of the lever and the clip is positioned to flex to facilitate assembly as the lever is inserted into the elongated hole, but then unflex to engage the notch and lock the knob to the lever.

In a narrower aspect, the shifter further includes mating electrical contacts on the shift lever and knob that engage with the one-touch motion of assembly of the knob onto the lever, a switch in the knob actuable via a thumb button on the knob, and conductors that connect the switch to the mating electrical contacts for actuating a pawl mechanism.

In another aspect of the present invention, an apparatus includes an elongated lever having a first end and including a locking surface near its first end, and a knob with an internal recess shaped to stably engage the first end. The knob also has an attachment clip positioned in the recess to mechanically frictionally engage the locking surface to lock the knob atop the lever with a single assembly motion, the attachment clip being characteristically not removable from a lateral side of the knob.

In another aspect of the present invention, a shifter includes a shift lever with a notch near its top, and a knob with attachment clip that mechanically locks the knob atop the lever with a single assembly motion of the knob toward the shift lever, the clip being located inside a lower tubular portion of the knob, the lower tubular portion being shaped to receive the top of the lever and the clip being positioned to flex to facilitate assembly as the lever is inserted into the tubular portion, but then unflex to engage the notch and lock the knob to the lever; the knob further including a removable shroud engaging a bottom portion of the knob in a position that covers the spring, the shroud preventing removal of the spring until the shroud is removed.

In another aspect of the present invention, a method includes steps of providing a shift lever including a notch near its top. A knob is provided with an elongated hole shaped to stably receive a top of the shift lever. An attachment clip is provided in one of the notch and hole for engaging the other of the notch and hole. The method further includes sliding the knob onto the top of the shift lever until the attachment clip mechanically locks the knob atop the lever with a single assembly motion, with the knob providing structure such that the attachment clip characteristically is not removable from a lateral side of the knob, the clip being positioned to flex to facilitate assembly as the lever is inserted into the elongated hole, but then unflex to engage lock the knob to the lever.

These and other aspects, objects, and features of the present invention will be understood and appreciated by those skilled in the art upon studying the following specification, claims, and appended drawings.

BRIEF DESCRIPTION OF DRAWINGS

FIG. 1 is a perspective view of a shifter embodying the present invention, including a lever and knob with mechanically actuated pawl mechanism.

FIG. 2 is an enlarged exploded perspective view showing the shifter of FIG. 1, and FIG. 2A is a view showing a similar but modified shift lever shaft.

FIG. 4 discloses an exploded perspective view of an alternative shifter.

FIGS. 5-6 are side and top views of the shifter of FIG. 4.

FIG. 7 is a cross section taken through line VII-VII in FIG. 6.

DETAILED DESCRIPTION OF PREFERRED EMBODIMENTS

Figure 3:
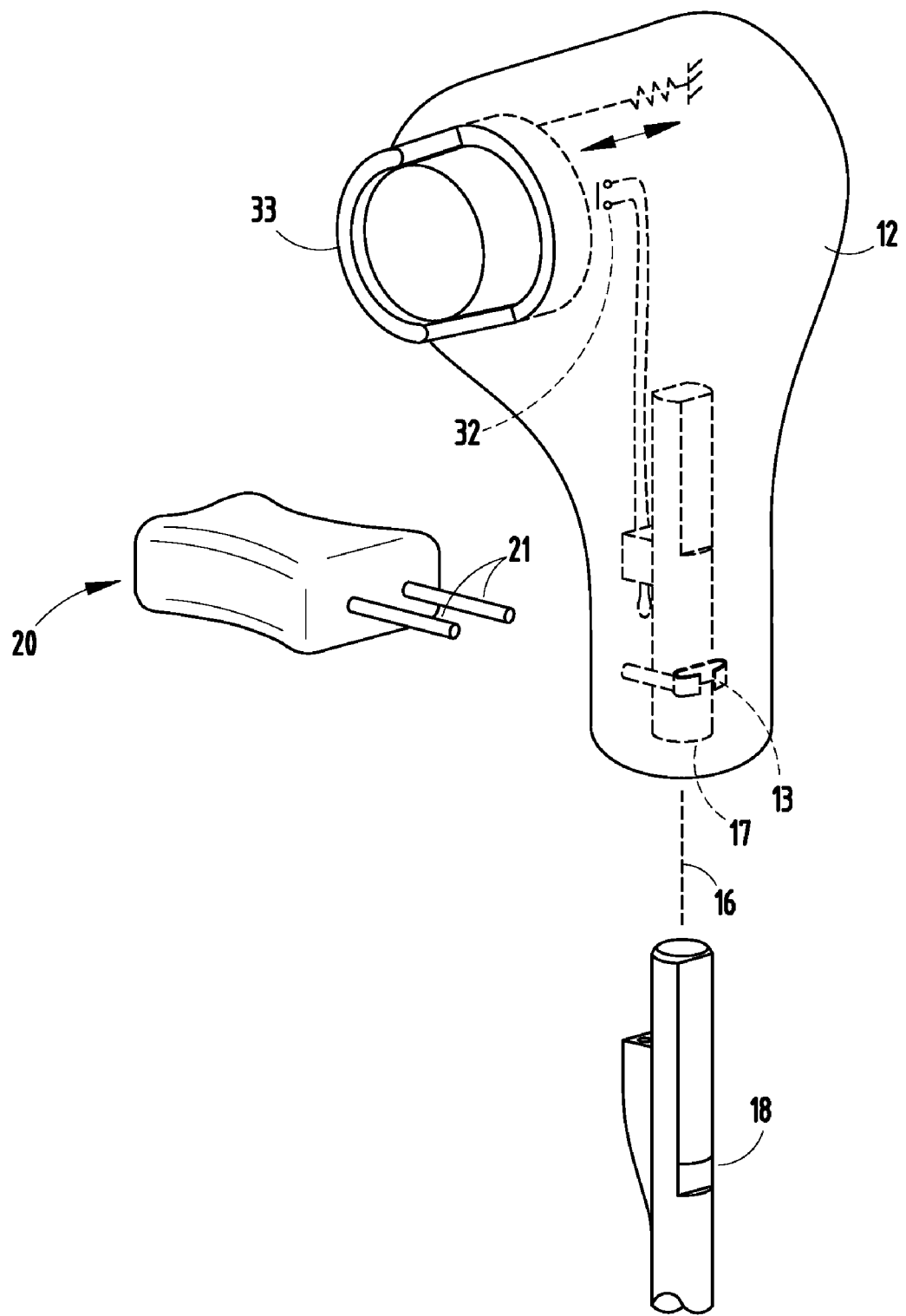
FIG. 3 is a view similar to FIG. 2, but including electrical connections and an electrically actuated pawl system.

A transmission shifter 10 (FIGS. 1-2) includes a shift lever 11 (or 11A), and a knob 12 with attachment clip 13 that mechanically locks the knob 12 to a top 14 (or 14A) of the lever 11 (or 11A) with a single linear assembly motion, illustrated by arrow 16. The clip 13 is located inside an elongated hole 17 in the knob 12, and the lever 11 includes a notch 18 (or notch 18A) near its top. The clip 13 is positioned to flex in a direction 15 to facilitate assembly as the lever 11 is inserted into the hole 17, but then unflex to engage the notch 18 and lock the knob 12 to the lever 11 (or 11A). To remove the knob 12 from the lever 11 (or 11A), a removal tool 20 is used. The tool 20 includes a pair of linear legs 21 that extend through access holes 23 in the knob 12 to engage ends of the clip 13, compressing it and pushing it out of the way sufficiently to allow the select knob 12 to be pulled off the lever 11 (or 11A).

It is contemplated that the shaft of the shift lever 11 can be narrow enough (or the legs 21 and access holes 23 spaced far enough apart) so that the legs 21 straddle the shaft of the lever 11 (as shown in FIG. 2). Alternatively, one or more holes can be drilled into the shaft (see lever 11A and holes 24 in FIG. 2A). Alternatively, a groove can be cut into opposing sides of the lever 11 to allow the legs 21 of the removal tool 20 to access and engage the clip 13.

An end of the lever 11 (or 11A) has a tapered surface 25 shaped to facilitate initial insertion of the lever 11 into the hole 17 in the knob 12. This also facilitates sliding the lever 11 past the clip 13 during installation. In one version, the clip 13 is positioned in the knob 12, and the lever 11 is inserted into the knob 12 past the clip 13. In another version, the clip 13 is positioned in the notch 18 in the lever 11, and then the knob 12 is inserted onto the lever 11 past the clip 13. It is contemplated that one or move angled surfaces can be included on the lever 11 to facilitate sliding the lever 11 past the clip 13 and into a fully-installed position. Also, it is contemplated that the ends of the clip 13 can be slightly angled to provide a lower-force installation and a higher-force removal of the knob 12. It is contemplated that the notch 18 can be made to different depths and sizes and shape, depending on the functional requirements of particular applications.

It is contemplated that the present components can be made of different materials. In a preferred form of FIGS. 1-2, the lever 11 includes a steel tube, the knob 12 includes molded plastic with overmolded-reinforcing inserts and internal moving parts (such as a mechanically-actuated pawl-control thumb button that engages a vertically-sliding straw for moving a pawl), and the clip 13 is made of spring steel. The illustrated clip 13 is C-shaped with opposing end sections 27 extending from a relatively flat center section 28 and that are reversely bent toward the center section 28 to form resilient compressible portions.

It is contemplated that the knob 12 can include an electrical circuit for actuating the pawl. When the knob 12 is assembled to the lever 11, it assembles with a linear sliding motion without any need for rotation, secondary motion or secondary attachment. This linear "one-touch" connection is advantageous, since it is conducive to making an electrical connection using "standard" male-to-female electrical connectors. This would allow electrical connections to be reliably connected during assembly in order to supply electrical power and communication with switches and other electrical devices in and on the shifter knob. For example, see FIG. 3, where male and female electrical connectors 30 and 31 complete a circuit including a switch 32 that senses when the thumb button 33 is depressed. This system is electrical and can result in lower cost, since the mechanical pawl-actuating system with a straw telescoping vertically within the tubular shift lever is not required.

FIGS. 4-7 disclose a modified shifter having similar components identified using the same numbers but with the addition of the letter "B." Shifter 10B includes a shift lever 11B and a knob 12B with attachment clip 13B that mechanically locks the knob 12B to a top 14B of the lever 11B with a single linear assembly motion, illustrated by arrow 16B. The clip 13B is located inside an elongated hole 17B in the knob 12B, and the lever 11B includes a notch 18B near its top. The clip 13B is positioned to flex in a direction 15B to facilitate assembly as the lever 11B is inserted into the hole 17B, but then unflex to engage the notch 18B and lock the knob 12B to the lever 11B.

Shifter 10B further includes a pin 40B that fits into a slot 41B in a top of the lever 11B. The pin 40B matably extends through a transverse hole 42B in the knob 12B and abuts a bottom of the slot 41B in the lever 11B to thus accurately set a depth of the knob 12B on the lever 11B. Further, a plastic support structure 44B is provided on the knob 12B to support the leaf-spring attachment clip 13B for engaging the notch in the lever 11B. This provides additional durability and makes for a more robust assembly, while minimizing the mass of material in the lever-receiving portion of the knob 12B. It is contemplated that the clip 13B can be positioned in the knob 12B prior to assembly of the lever 11B to the knob 12B (such as by insert molding the clip into the knob during molding or by pre-assembly into the bore of the knob 12B), or alternatively that the clip 13B can be positioned in the notch 18B in the lever 11B and held in position as the knob 12B is assembled to the lever 11B. Notably, in one version, it is contemplated that the clip 13B will be in the notch in the lever 11B for insertion into the knob 12B during an initial assembly. However, when the knob 12B is removed using the tool 20, the clip 13B will stay in the knob 12B . . . such that a second assembly has the clip 13B already in the knob 12B. Thus, one structural arrangement may facilitate both pre-positions of the clip 13B. It is contemplated that the apparatus 10B can include the mechanical pawl actuation mechanism shown in FIGS. 1-2 (several such pawl-actuating mechanisms being known in the art), and that it can include the electrical pawl-actuating system as shown in FIG. 3.

It is contemplated that a tubular shroud 60C can be positioned on a bottom tubular portion of the knob, such as is illustrated on knob 12B in FIG. 7. The shroud 60C is adapted to slip vertically onto the bottom tubular portion of the knob 12B, and to frictionally engage when in its upwardly-installed position, such as by a detent that engages a top of the support structure 44B. When engaged, the shroud 60C aesthetically covers the bottom tubular portion, including the structure 44B and the spring 13B. At the same time, the shroud 60C does not interfere with the one-touch installation described above. When lowered, the shroud 60C exposes the spring 13B, such that the spring 13B can be poked out horizontally from its nested position, thus allowing the knob 12B to be removed from the shift lever 11B without a specialized tool. In the first version described above, the shroud 60C snaps vertically upwardly into its installed position. It is contemplated that alternative designs of the shroud are possible. For example, in another version, the tubular shroud 60C is made to slip vertically to a position covering the support structure 44B and then rotate in order to frictionally engage the support structure 44B. This arrangement provides a more positive vertical retention since the shroud is not downwardly removable until it is first rotated to a vertically-released position. It is contemplated that other frictional retaining means can be used, such as separate detent bumps and undulations, frictional materials, and the like.

It is contemplated that a scope of the present invention includes not only transmission shifter for vehicles, where aesthetics are important to vehicle drivers, but also the scope includes other uses where an aesthetic knob is preferably attached quickly, securely, and without complicated or secondary motions, yet where the knob must be made removable for replacement and/or repair.

The embodiments of the invention in which an exclusive property or privilege is claimed are defined as follows:

1. An assembly, comprising:
   a lever including a notch near its top; and
   a knob with attachment clip that mechanically locks the knob atop the lever with a single assembly motion of the knob toward the lever, the clip being located inside an elongated hole in the knob, the elongated hole being shaped to receive the top of the lever and the clip being positioned to flex to facilitate assembly as the lever is inserted into the elongated hole, but then unflex to engage the notch and lock the knob to the lever with the clip being within the notch on only one side of the lever and extending only laterally from the notch, wherein the knob and clip are separate components, the knob and lever each having aligned portions of an access hole extending to the clip.

2. The assembly defined in claim 1, wherein the knob further includes at least one access hole extending transversely to the elongated hole, the at least one access hole extending to the clip and located so that a removal tool can be extended through the access hole to depress the clip, pushing it out of the way and allowing the select knob to be pulled off the lever.

3. The assembly defined in claim 1, wherein the clip is made of spring steel.

4. The assembly defined in claim 1, wherein the clip is C-shaped with opposing end sections extending from a center section and also reversely bent toward the center section.

5. The assembly defined in claim 1, wherein the knob includes a removable shroud engaging a bottom portion of the knob in a position that covers the spring, the shroud preventing removal of the spring until the shroud is removed.

6. The assembly defined in claim 5, wherein the bottom portion of the knob is tubular and the shroud is tubular and adapted to fit over the bottom portion of the knob.

7. The assembly defined in claim 1, including mating electrical contacts on the knob and the lever that engage when the knob is installed on the lever, the knob further including a thumb button, an electrical switch operated by the thumb button, and conductors that electrically connect the mating electrical contacts to the switch.

8. The assembly defined in claim 1, wherein the lever has a first end and the notch includes a locking surface near the first end; and the attachment clip being positioned to mechanically frictionally engage the locking surface to lock the knob atop the lever with a single assembly motion.

9. The assembly defined in claim 8, wherein the knob includes a removable shroud engaging a bottom portion of the knob in a position that covers the clip, the shroud preventing removal of the clip until the shroud is removed.

10. The assembly defined in claim 9, wherein the bottom portion of the knob is tubular and the shroud is tubular and adapted to fit over the bottom portion of the knob.

11. The assembly defined in claim 8, including mating electrical contacts on the knob and the lever that engage when the knob is installed on the lever, the knob further including a thumb button, an electrical switch operated by the thumb button, and conductors that electrically connect the mating electrical contacts to the switch.

12. The assembly defined in claim 1, wherein the clip is C-shaped.

13. The assembly defined in claim 1, wherein the clip includes a center portion and flexible ends, one of which is positioned in the notch and another of which extends from the notch into engagement with the knob.

14. The assembly defined in claim 1, wherein the knob and clip are configured so that the clip is characteristically not removable from a lateral side of the knob.

15. The assembly defined in claim 1, wherein the knob includes only a single one of the attachment clip.

16. A transmission shifter including a shift lever, the shift lever being the lever defined in claim 1.

* * * * *